June 25, 1929.      L. HAMER      1,718,903
STEERING WHEEL ELECTRIC CONTACT
Filed Sept. 1, 1927
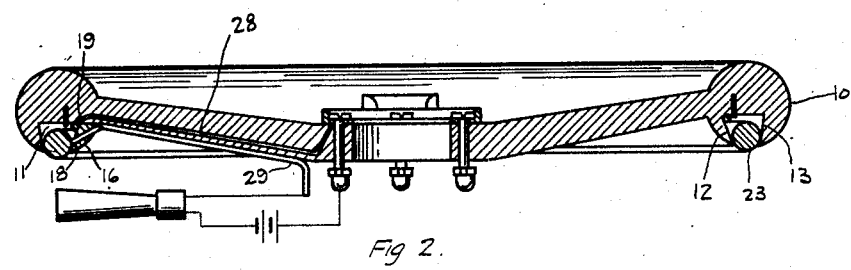
Fig 2.
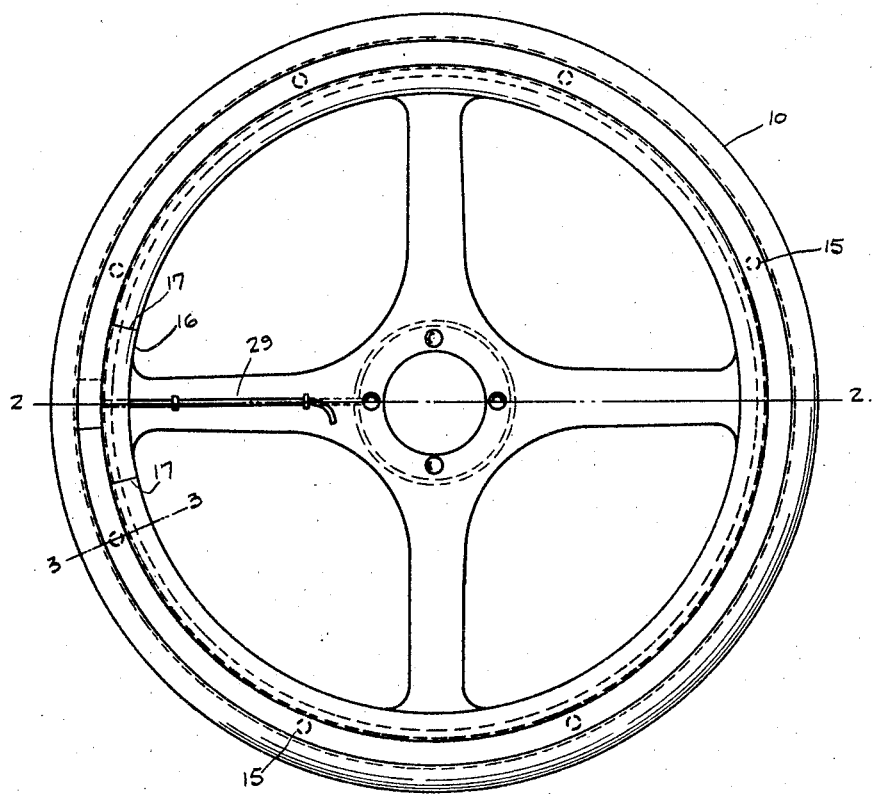
Fig. 1
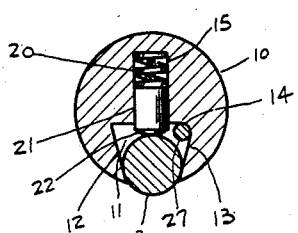
Fig. 3.
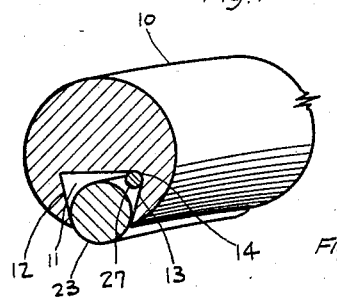
Fig 4.
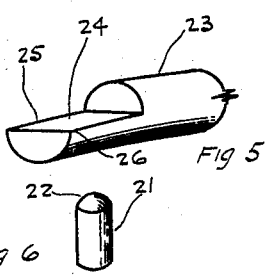
Fig 5
Fig 6
Inventor:
L. Hamer.
by: E. J. Fetherstonhaugh
Attorney.

Patented June 25, 1929.

1,718,903

UNITED STATES PATENT OFFICE.

LOUIS HAMER, OF MONTREAL, QUEBEC, CANADA.

STEERING-WHEEL ELECTRIC CONTACT.

Application filed September 1, 1927. Serial No. 216,997.

The invention relates to steering wheel electric contacts, as described in the present specification and illustrated in the accompanying drawings that form part of the same.

The invention consists essentially of the novel features of construction pointed out broadly and specifically in the claim for novelty following a description containing an explanation in detail of an acceptable form of the invention.

The objects of the invention are to eliminate the constant or inadvertent sounding of the horn in devices of this kind and yet permit a firm grip of the wheel for driving purposes; to enable a driver of a motor vehicle to have free use of one hand for signalling and other actions without interfering with the sounding of the horn at requisite moments; to insure a permanent and reliable horn operating switch that will prove adaptable to all cars and all makes of wheels; to maintain the conventional appearance of the car in so far as the steering wheel is concerned and still facilitate the blowing of the horn without loosening either hand from the firm grip of the wheel; to avoid the loss of many lives and the destruction of property incidental to the lack of proper warnings from audible signals due to the failures of careless and nervous drivers in sounding the horn; to instal a handy electric switch in a motor car adaptable for horn blowing and any other uses that may occur to the constructor from time to time and generally to provide a safe, simple and serviceable electric switch at a moderate cost.

In the drawings, Figure 1 is a plan view of the underside of the wheel rim showing the operating electric contact ring and the interior arrangement in dotted lines.

Figure 2 is a cross sectional view on the line 2—2 in Figure 1.

Figure 3 is a cross sectional view on the line 3—3 in Figure 1.

Figure 4 is a fragmentary perspective view of a portion of the rim complete.

Figure 5 is a fragmentary perspective view of a portion of the electric contact ring.

Figure 6 is a perspective detail of a push button support.

Like numerals of reference indicate corresponding parts in the various figures.

In this particular art, it has been discovered by the applicant in the pursuit of bringing the invention to a practical stage that many others have had a similar object in view and it has been clearly shown by others that as far back as twenty six years ago steering handle electrical switches were known and within the last ten years various attempts have been made to construct a satisfactory steering wheel switch and one form is very much in evidence in which the rim of the steering wheel is split, so that by pressure against spring cushions one or more contacts are brought into engagement with ground contacts and the horn sounded or other device operated and the differences in the several patented devices are largely in the forms of contacts and the types of springs.

Similar inventions in modified form in France, and England exist and probably other countries and in one instance noted, an additional ring has been added as an electric switch within the circle of the steering wheel rim and it is believed has been tried out commercially, but these forms all have great drawbacks, as the inner ring is not any more convenient than the conventional horn blowing bulb and the split rims are difficult to adjust to the pressure accompanying steering operations. Again during the same period grooves or channels have been cut in the rims and contacts or strips carrying contacts have been inserted in the channels as fillers and these forms are only slight variations of the split wheel type, in fact the resemblance in some instances is startlingly close and it is not seen how the objections found in the split rim device have been overcome. Again in the same period an invention has been made in which the electrical contacts of the switch are actually within the rim of the wheel and keeper rings secured by screws to the rim inserted as guides through a contact holder and springs encircling these screws, in other words, the device is sunk in the rim and consequently the grip on the wheel must be loosened in order to reach the sunken contact member and give it sufficient pressure.

It will be thus seen that this problem has been attacked from many angles, which only goes to show how important the solution is and in the present invention the device has been thoroughly tried out and the difficulties previously discovered do not seem to exist, in fact the ordinary firm grip of the steering wheel is quite in order without affecting the horn at all and yet by slightly increasing the strength of the grip, particularly on the contact, the horn is sounded with ease, naturally by accustomed use this act becomes habitual and ordinary to the driver and is never a nuisance, such as pertains to the less advanced types of steering wheel switches. This efficiency is reached by maintaining the ring contact firmly against the groove edges and extending it transversely from edge to edge to close the groove from the inside, that is to say, the contact is threaded into a narrow mouthed groove in the rim and spring pressed against the converging walls of said groove thereby forming a resilient closure at any place around the rim, there being no fasteners to become loose or no congestion of parts to affect the coaction of the contacts, in fact there are no hard spots and consequently the driver does not miss sounding the horn under alarming circumstances. The operating contact is a free agent not requiring guides or fasteners and therefore it is equally operable at all points on account of being spring pushed at regular intervals against the walls as explained, which is sure to clear it at all times, except on the application of the proper pressure.

Before going into details it may be said that this wheel switch has been practically demonstrated on the highway and in the city streets on many cars and in no instance has a failure been reported. The failure in the working of the wheel switches has no doubt caused the abandonment of the inventions commercially, because in turning and backing, it is natural to grip harder on the steering wheel and oftentimes it is inadvisable to sound the horn and to do so accidentally might result in some inconvenience, certainly it is unpleasant and frequently against the law to blow the horn without just cause and may be termed a nuisance. To refrain from the casual horn alarms it is essential to have the free contact, no guides or other devices are necessary and the groove may be made in the top, bottom or sides of the rim.

Further it is shown that the edges of the annular mouth of the groove actually protect the operating contact from undue pressure and it seems that there is really more in the manner of holding this contact in the groove than at first appears evident. The curving away of the round rod leaves the thickness of the wood and if the curve of the rim is sharp the projecting edges are much accentuated in their projection. All of this goes towards the perfecting of the invention for the wheel electric switch is really no good, if it sounds the horn accidentally and likewise it is of little use if the wheel cannot be strongly gripped for steering purposes.

Referring to the drawings, the numeral 10 indicates the rim of a steering wheel of a motor vehicle preferably made of wood though not necessarily so, said rim having in the underside the annular groove or channel 11, this channel being incut in its side walls, thereby forming the converging annular bevels 12 and 13. The bed of the groove and the one side wall are further annularly recessed to form the wire receptacle 14, and bored centrally at intervals forming the post holes 15.

The filler 16 closes the slot 17 in the inner wall of the channel and completes the wall at that place. The wire holes 18 and 19 lead through the inner wall of the channel for the ground and operating contact connections.

The spiral springs 20 are contained in the holes 15 and the posts 21 seated thereon in said holes and partly rounded on the tops 22.

The electrical contact ring 23 is formed transversely with the round surface 24 engaging with the bevelled wall surfaces 12 and 13 and held thereby to the spring posts 21.

The ground wire 27 is introduced into the recess 14 and is partly in said recess and partly in the channel 11 so that it forms a ring contact directly in the path of the operating contact 23. The wire 28 connects the ground wire 27 to a metal part of the vehicle and the wire 29 connects the operating contact ring 23 to the car electrical battery or other source of supply, the horn of the vehicle being included in the circuit or other electrical translating device.

In the operation of this device the steering wheel suported on the steering post as usual is grasped by both hands, and the horn is sounded by exerting a slight extra pressure of the fingers on the contact 23. This extra pressure is not necessarily the firm grip on the rim of the wheel, for that does occur without operating the horn, in fact the ordinary grasp of the wheel in no way affects the operating electrical contact and it requires a real pressure inwardly on the contact independently of the customary grip on the wheel rim. The constructional features accomplish the objects of this invention and it will be found that the freedom of the endless ring contact in the groove constitutes the feature that makes the switch operable at the desired times and inoperable at other times. The ring is inserted through the opening in the groove subsequently filled and the slotted end of the round rod that forms the contact soldered or welded together making a complete ring of conducting metal protected by the sides of the groove and yet readily pressed.

What I claim is:—

A steering wheel rim having an annular groove formed in cross section with a wide bed in respect to a narrow mouth and consequently converging walls, an annular ground contact in the bed of said groove to one side of the centre and a floating contact resiliently held to the lips of said mouth and coacting with said ground contact in closing a suitably energized electrical circuit including a translating device.

Signed at Montreal, Canada, August, 1927.

LOUIS HAMER.